(12) United States Patent
Besoain Canales et al.

(10) Patent No.: US 10,993,444 B2
(45) Date of Patent: May 4, 2021

(54) GLUCONOBACTER CERINUS PLUS HANSENIASPORA OSMOPHILA FOR CONTROLLING FUNGAL INFECTIONS IN PLANTS AND FRUITS

(71) Applicant: PONTIFICIA UNIVERSIDAD CATÓLICA DE VALPARAÍSO, Vaparaíso (CL)

(72) Inventors: Ximena Alejandra Besoain Canales, Valparaíso (CL); Fabiola Francisca Cadiz Morales, Valparaíso (CL); Eduardo Salgado Varas, Valparaíso (CL)

(73) Assignee: PONTIFICIA UNIVERSIDAD CATÓLICA DE VALPARAÍSO, Valparaíso (CL)

( * ) Notice: Subject to any disclaimer, the term of this patent is extended or adjusted under 35 U.S.C. 154(b) by 257 days.

(21) Appl. No.: 15/779,289

(22) PCT Filed: Nov. 24, 2016

(86) PCT No.: PCT/CL2016/050064
§ 371 (c)(1),
(2) Date: Nov. 6, 2018

(87) PCT Pub. No.: WO2017/088081
PCT Pub. Date: Jun. 1, 2017

(65) Prior Publication Data
US 2019/0059387 A1   Feb. 28, 2019

(30) Foreign Application Priority Data

Nov. 27, 2015  (CL) ................... 3484-2015

(51) Int. Cl.
*A01N 63/30* (2020.01)
*A01N 63/00* (2020.01)
(52) U.S. Cl.
CPC ............. *A01N 63/00* (2013.01); *A01N 63/30* (2020.01)
(58) Field of Classification Search
CPC ................................ A01N 63/00; A01N 63/30
See application file for complete search history.

(56) References Cited

U.S. PATENT DOCUMENTS 3,616,225 A   10/1971 Nishinomiya et al.
5,773,264 A    6/1998 Weber et al.

OTHER PUBLICATIONS

Guzzon, R. et al., Eur. Food Res Technol. 2014 vol. 239, pp. 117-126.*
Antunes, J. & Aguiar, C. "Search for killer phenotypes with potential for biological control", Annals of Microbiology, 2012, vol. 62, No. 1, p. 427-433.
Extended European Search Report for Aapplication No. EP16867501; dated Apr. 23, 2019; 14 pages.
Guzzon, R. et al., "A new resource from traditional wines: characterisation of the microbiota of "Vino Santo" grapes as a biocontrol agent against Botrytis cinerea", European Food Research and Technology, 2014, vol. 239 (1), p. 117-126.
International Search Report for International Application No. PCT/CL2016/050064 filed Nov. 24, 2016; dated Mar. 24, 2017; 2 pages.
Leverentz et al., "Biocontrol of the Food-Borne Pathogens Listeria monocytogenes and *Salmonella enterica* Serovar Poona on Fresh-Cut Apples with Naturally Occurring Bacterial and Yeast Antogonists".
McNally et al., "Biocontrol of Botrytis cinerea in table grapes by non-pathogenic indigenous *Saccaromyces cerevisiae* yeasts isolated from viticultural environments in Argentina", Postharvest Biology and Technology 64 (2012) pp. 40-48.
Ponsone, M. L. et al. "Biocontrol as a strategy to reduce the impact of ochratoxin A and *Aspergillus* section Nigri in grapes" International Journal of Food Microbiology, 2011, vol. 151, No. 1, p. 70-77.
Sharma, R. R. et al, "Biological control of postharvest diseases of fruits and vegetables by microbial antagonists: A review" Biological control, 2009, vol. 50, No. 3, p. 205-221.
Written Opinion of the International Searching Authority for International Application No. PCT/CL2016/050064; International filed: Nov. 24, 2016; dated Mar. 24, 2017; 10 pages.
Granchi, L. et al., Oenological properties of Hanseniaspora osmophila and Kloeckera corticis from wines produced by spontaneous fermentations of normal and dried grapes, FEMS Yeast Research. Aug. 2002, 2(3):403-407 (abstract only).
Viana, F. et al., Increasing the levels of 2-phenylethyl acetate in wine through the use of a mixed culture of Hanseniaspora osmophila and *Saccharomyces cerevisiae*, International Journal of Food Microbiology 135 (2009) 68-74.

* cited by examiner

*Primary Examiner* — Heidi Reese
(74) *Attorney, Agent, or Firm* — Cantor Colburn LLP

(57) ABSTRACT

The present invention relates to a biological product useful for the control of fungal diseases in plants comprising bacteria of *Gluconobacter* genus and yeast of *Hanseniaspora* genus. It also includes a method for preparing the aforementioned biological product and uses thereof to treat, prevent, control or cure fungal diseases in plants.

25 Claims, 12 Drawing Sheets

A) Cluster rot (With wound): Incidence

Grapes with symptoms (% of cluster)

B) Cluster rot (With wound): Severity

Injury diameter (cm)

C) Cluster rot (Without wound): Incidence

Grapes with symptoms (% of cluster)

D) Cluster rot (Without wound): Severity

Injury diameter (cm)

GLUCONOBACTER CERINUS PLUS HANSENIASPORA OSMOPHILA FOR CONTROLLING FUNGAL INFECTIONS IN PLANTS AND FRUITS

TECHNICAL FIELD

The disclosure concerns a biological product useful for control of fungal diseases in plants. More particularly, the disclosure concerns bacteria of *Gluconobacter* genus and yeast of *Hanseniaspora* genus and a method for preparing the aforementioned biological product and uses thereof to treat, prevent, control or cure fungal diseases in plants.

DISCLOSURE BACKGROUND

It has been shown that the main conditions affecting the fruits in pre and post-harvest are caused by fungal genera corresponding to *Rhizopus, Botrytis, Aspergillus* and *Penicillium*, which have the potential to produce different types of diseases, including diseases called cluster rot and gray rot [1]. For the control of fungal pathogens in plants, various strategies have been used, including the use of chemical compounds that are potentially harmful to human health, not to mention that they can select resistant pathogenic strains.

Export perishable agricultural products to distant markets represent significant challenges for arriving under suitable conditions and support its commercialization [2, 3]. For example, the grape is mainly affected by two diseases, cluster rot or acid rot and gray rot what cause the greatest crop losses both pre and postharvest.

Main factors influencing the rate of damage caused by cluster rot at harvest, 60 and 120 days post-refrigerated storage, correspond to the incidence of powdery mildew and high nitrogen fertilization, among others. [2]. Powdery mildew is a disease where the fungus *Uncinula necator* is able to directly enter the berry and produce microcracks in both leaves and fruits during the pre-harvest, and thus allows the entry of other pathogens that only enter through wounds, such as *Rhizopus* spp., *Aspergillus* spp. and *Penicillium* spp., potentiating the disease that they cause.

To avoid the significant losses that these pathogens can cause, numerous economic resources have been invested to increase the synthetic fungicides applications. However, for 25 years, chemical control of diseases has been hampered by the continuous development of resistance by pathogens to synthetic fungicides, regardless of their way of action or combination.

In Chile there have been cases of specific resistance and other more complex ones such as multidrug resistance [4]. In the field, the specific resistance to active ingredients, such as benzimidazoles, phenylcarbamates and dicarboximides, was detected shortly after its introduction [5].

In 2009, the first report of the isolated of *Botrytis cinerea* with multidrug resistance in Chile was presented [6]. Such resistance is associated with the repeated use of synthetic fungicides of normal use such as fludioxinil, cyprodinil, pyrimethanil and fenhexamide. [4]. Therefore, in Chile there is not only specific resistance but there are also more complex cases such as multidrug resistance. [4].

Due to the reasons explained above, the emphasis has been placed on the biological control of plant pathogens by using other organisms that prevent or hinder pathogens development, without affecting the crop viability or consumers health.

In this regard, it is now possible to find numerous articles regarding biological control of diseases by plant pathogens, among which the use of filamentous fungi, yeasts or bacteria as bio-control agents is highlighted.

The first biological control of post-harvest diseases was made in 1977 by Tronsmo and Dennis, where it was published that the use of fungus *Trichoderma* was useful to control gray rot in raspberries[7]. *Trichoderma* is one of the most commonly used fungi as a bio-controller of fungal diseases. In fact, in the United States and in other countries, a series of isolated and diverse forms of control of different fungal diseases based on this fungus have been patented. [8-16]. According to reports found for bio-control pathogen using yeast, *Pichia guilliermondii* stands out, a known yeast with biological control effect. *Picchia* has a bio-control effect on *Rhizopus nigricans* in tomato fruits in storage. This yeast is able to activate enzymes defense of the fruit and also fights for the site and nutrients [17]. The M8 strain of *Picchia guilliermondii* was reported as a potential bio-controller of *Botrytis cinerea* in apples under storage conditions and in apple juice. Yeast induces the fruit defense response, competes for nitrogen, carbon sources and secretes hydrolytic enzymes [18]. The Z1 strain of *Picchia guilliermondii* is used in citrus mixed with waxes to control blue mold (*Penicillium italicum*). In orange juice, it is able to inhibit the spores' germination. It acts through competition for nutrients [19].

The *Picchia caribbica* species is able to control *Penicillium expansum* in apples. However, oxidative stress tolerance of yeast is improved with the application of ascorbic acid and therefore the effect on *Penicillium expansum* would be improved [20].

Some acetate esters produced by apples stimulate the germination of conidia of *Botrytis cinerea*. However, this effect can be suppressed with yeasts such as *Cryptococcus laurenthi, Sporobolomyces roseus* or *Saccharomyces cerevisae*, the first two being more effective in suppressing conidia germination [21]. On the other hand, the butyl acetate produced by apples increases adhesion of conidia of *Botrytis cinerea*, stimulating its germination. However, *Cryptococcus laurenthi* and *Sporobolomyces roseus* may reduce this effect, but not *Saccharomyces cerevisiae*. This fact reinforces the need to perform empirical searches of effective bio-control strains [22].

*Saccharomyces cerevisiae* has been registered in a series of patents as a biological controller for different diseases. For example a composition and phytosanitary method from such yeast to treat or protect plants from diseases caused by various pathogens [23].

Other important yeasts genera in biological control correspond to *Rhodotorula* and *Metschnikowia*. A series of species and isolated in formulations have been registered as a method for controlling pre and post-harvest diseases, especially blue mold, gray rot, *mucor* and fruit rots. [24]. Strains of *Metschnikowia* species have been registered in patents for controlling fruit decay caused by *Penicillium expansum* [1].

As for the biological control of diseases in grapes, we can mention that *Candida sake* CPA-1 plus Fungicover®, *Ulocladium oudemansii* and chitosan are able to significantly reduce the severity of acid rot, with 40 to 60% inhibition compared to control. However, the incidence of disease was not significantly reduced by any of the treatments [25].

On the other hand, *Candida saitoana*, with a composition of other species of this genus plus enzymes, have been registered as biological control for plant diseases, especially for post-harvest diseases. [26].

In addition, 16 isolated of *Saccharomyces* and 27 isolated corresponding to yeasts other than *Saccharomyces* showed antagonistic properties on some of the pathogenic fungi at 25° C. [27]. In another work done by the same authors, a total of 225 yeast isolated from grapes, vineyard soil and grape must they were collected in order to be evaluated regarding *Botrytis cinerea* control. The 65 isolated corresponded to 15 species that inhibited *Botrytis cinerea* at 25° C. under in vitro conditions. Only one of these isolated *Saccharomyces cerevisiae* BSc68, inhibited mycelial growth in grapes at 2 and 25° C. All the isolated determined with antifungal activity came from must in fermentation [28].

Furthermore, among the reports found for bio-control pathogen using bacteria, we found *Bacillus subtilis*, one of the most studied bacteria as bio-control. *Bacillus subtillis* corresponds to a native strain isolated from the soils of central Mexico and which has been reported as a bio-controller of *Sporisorium reilianum* in corn in treatments applied to seeds [29]. As in the case of bio-control fungi, a series of patents have been granted for different isolated of *Bacillus* used to control various diseases in plants. [30-39].

Another very studied genus is the *Pseudomonas*. CCR04 and CCR80 strains of *Pseudomonas corrugata* have proved to be very effective in the colonization of pepper roots. Thus they can inhibit infection *Phytophthora capsici* in the crop [40]. *Pseudomonas aeruginosa*, meanwhile, produces metabolites with antibiotic activity capable of controlling the diseases caused by *Xanthomonas* spp., so it could be an alternative to conventional bactericides used for its control [41]. In addition, it has been reported that the bacteria *Pseudomonas fluorescens, Serratia liquefaciens, Serratia plymuthica, Bacillus subtilis, Bacillus pumilis* and *Bacillus polymyxa* have been registered for controlling *Botrytis cinerea* and *Alternaria* brassicola in cabbage. [42].

In Chile *Serratia plymuthica* CCGG2742 bacteria was isolated from grape berries and registered as US patent for controlling plant diseases, particularly preventing infection of *Botrytis cinerea* in fruits that can be infected [43].

Acetic acid bacteria (AAB), on the other hand, are of special biotechnological interest in the industrial processes involved in the production of cellulose, sorbose and vinegar. The family is known as Acetobacteraceae and has 12 genera [44]. *Gluconobacter* genus, one of the most common among the Acetobacteriaceae, includes 14 species of which 5 are used in food manufacture, mainly because they are harmless to human health [45]. These bacteria are strictly aerobic, chemoorganotrophic and Gram-negative. They grow between 4 and 40° C. with an optimum of 30° C. and an optimum pH of 5 to 6 [46]. They live on the surface of vegetables and fruits mainly as symbiotic saprophytes. In bacteria isolated from fruits and flowers in Thailand, 45 isolated of *Gluconobacter* genus were found. Of these, 17 strains corresponded to *Gluconobacter oxydans*, 12 strains to *Gluconobacter cerinus*, 9 strains to *Gluconobacter frateurii* and 6 strains to *Gluconobacter thailandicus*. [47]. In harvest from grapes with rot in three vineyards in Adelaide Hills (South Australia), 9 different species of acetic acid bacteria were found, among which, 4 species corresponded to *Gluconobacter* genus. *Gluconobacter cerinus* was the main species identified in the above vineyards [48]. In grapes rotted or infected with *Botrytis* spp., the number of acetic acid bacteria increases drastically, going from a few to around $1\times10^6$ [CFU/ml] after infection with *Botrytis* spp. [49]. When this occurs, AAB species can begin to master.

Currently, there are almost no reports of bacteria of *Gluconobacter* genus in biological control. However, the use of *Gluconobacter oxydans* with antifungal and antipatulin activity in apple juice has been reported [45]. The bacterium was isolated from the surface of apple fruits and, under in vitro conditions it was able to reduce the diameter of the mycelial growth of *Penicillium expansum* by 42.3%. On the other hand, a high level of efficiency and complete prevention was shown in the accumulation of patulin in apple juice.

To avoid the development of diseases in fruits and leaves caused by fungal pathogens, the use of synthetic fungicides or treatments based on natural and/or biological products is frequently resorted to. Synthetic fungicides are effective but difficult to export to demanding markets because of the potentially harmful effects on animals and plants. Biological fungicides, meanwhile, may be safer and more accepted in different markets, but today it has been observed they do not have good levels of efficiency, especially when compared to synthetic fungicides. In light of this background, the need to develop new biological fungicides with improved antifungal activities becomes obvious.

Although numerous antifungal biological control procedures have been developed and patented in several countries, very few are practically used in agriculture today. This is due, firstly, to the high demand for quality and safety of products required by international markets and, secondly, that proposed bio-controllers do not reach the effectiveness required to comply with trade regulations of the various countries. This causes producers and exporters necessarily resorting to synthetic products, which are under strict control by good agricultural practices (GAP) and are subject to stringent examinations in target markets. In addition, public opinion considers them unfriendly to human health and the environment.

For these reasons it is necessary to have a biological and/or natural product able to effectively control the main causative agents of diseases in the pre- and post-harvest of fruits and/or plants, which does not generate problems of marketing restrictions in target markets, which present no resistance, compatible with the storage and refrigerated transport, environmentally friendly and safe for human health.

BRIEF SUMMARY

The present disclosure is directed to biological products to control plant fungal diseases, compositions comprising them, methods for their preparation and instructions for use.

The disclosure covers a biological product for the control of fungal diseases in plants comprising bacteria of *Gluconobacter* genus and yeast of *Hanseniaspora* genus. In some aspects, *Gluconobacter* may correspond to *Gluconobacter cerinus*, more preferably to *Gluconobacter cerinus* strain 515, access code RGM2215, deposited Jun. 11, 2015 in the Chilean Collection of Microbial Genetic Resources, Av. Vicente Méndez No 515, Chillán, Chile. Meanwhile, *Hanseniaspora* may correspond to *Hanseniaspora osmophila*, more preferably to *Hanseniaspora osmophila* strain 337, access code RGM2214, deposited Jun. 11, 2015 in the Chilean Collection of Microbial Genetic Resources, Av. Vicente Méndez No 515, Chillán, Chile.

The disclosure also encompasses a method for preparing the biological product for the control of fungal plant diseases, wherein such method comprises mixing at bacteria $1\times10^6$ [CFU/ml] of *Gluconobacter* and at least $1\times10^4$ [CFU/ml] of *Hanseniaspora*, preferably $1\times10^{06}$ [CFU/ml] to $1\times10^8$ [CFU/ml] of *Gluconobacter* and $1\times10^4$ [CFU/ml] to $1\times10^6$ [CFU/ml] of *Hanseniaspora*.

Therefore, the biological product for the control of fungal plant diseases comprises at bacteria $1 \times 10^6$ [CFU/ml] of *Gluconobacter* spp. and at least $1 \times 10^4$ [CFU/ml] of *Hanseniaspora* spp.

The disclosure also encompasses a method for the control of fungal plant diseases, which comprises administering to a plant organism a biological product containing bacteria of *Gluconobacter* genus and yeast of *Hanseniaspora* genus.

In another aspect, the disclosure encompasses the use of a biological product comprising bacteria of *Gluconobacter* genus and yeast of *Hanseniaspora* genus, because it is useful to treat, prevent, control or cure fungal diseases in plants. On one side, diseases that can be treated are prevented, controlled, or cured by using the product of the present disclosure include fungal diseases caused by Deuteromycota, comprising diseases caused by *Aspergillus* spp., *Penicillium* spp., *Botrytis* spp., among others. In addition, the present disclosure can be used to treat, prevent, control or cure fungal diseases in plants produced by Zygomycota, including *Rhizopus*, among others. Additionally, the disclosure product can be used in fruit plants such as vines, pomegranates, prunus, citrus and berries; fruit vegetables such as tomatoes, paprika, eggplant, zucchini; and leafy vegetables such as lettuce, chard, spinach.

Finally, the biological product of the disclosure can be used to treat, prevent, control or cure acid rot or cluster rot, and gray rot, among other fungal diseases.

BRIEF DESCRIPTION OF THE DRAWINGS

The foregoing features and advantages of the disclosure will be evident from the following more particular description of preferred methods of the disclosure, as illustrated in the attached drawings.

Figure 1:
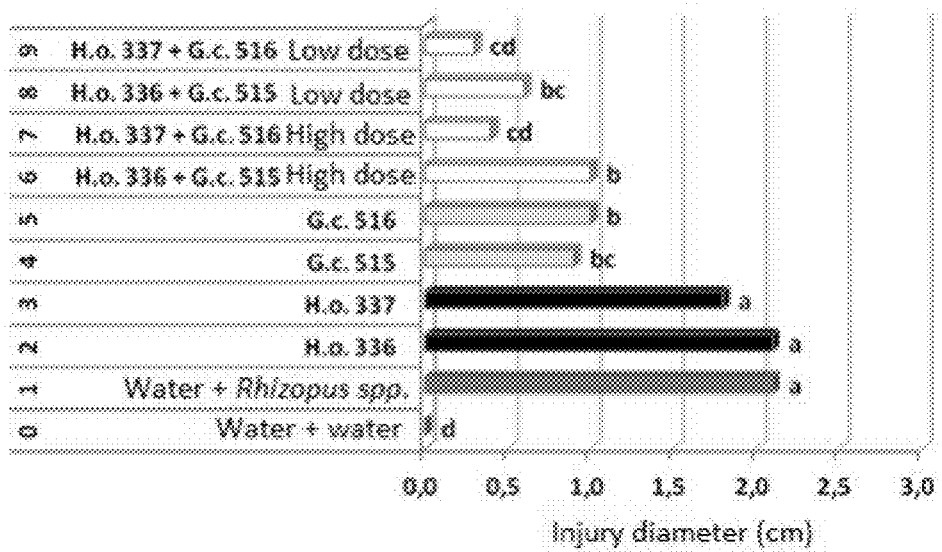
FIG. 1 shows a Treatment graph v/s injury Diameter (cm), where the treatment effect with *Gluconobacter cerinus* (G.c.) (strain 515 and 516) and/or *Hanseniaspora osmophila* (H.o.) (strain 336 and 337) is observed on the development of *Rhizopus* pp. in grape berries cv Red Globe. Bars represent the injury diameter generated by *Rhizopus* spp infection in grape berries in front of the different treatments. The figure shows the effects at 4 (A) and 15 (B) days after infection with the pathogenic fungus. The used concentrations of *Gluconobacter cerinus* (strain 515 and 516) are: High dose ($1 \times 10^8$ [UFC/ml]) and Low dose ($1 \times 10^6$ [UFC/ml]). The used concentrations of *Hanseniaspora osmophila* (strain 336 and 337) are: High dose ($1 \times 10^6$ [UFC/ml]) and Low dose ($1 \times 10^4$ [UFC/ml]). The concentration used for *Hanseniaspora osmophila* (strain 336 and 337) in treatments 2 and 3, is High dose. The concentration used for *Gluconobacter cerinus* (strain 515 and 516) in treatments 4 and 5, is High dose C. Grape berries were inoculated with $1 \times 10^5$ [spores/ml] of *Rhizopus* spp. The positive control corresponds to the treatment of Water+*Rhizopus* spp. (complete injury) and the negative control corresponds to the Water+Water treatment (absence of injury). The letters to the right of the bars correspond to different categories according to the Tukey test ($p \leq 0.05$).
Figure 1:
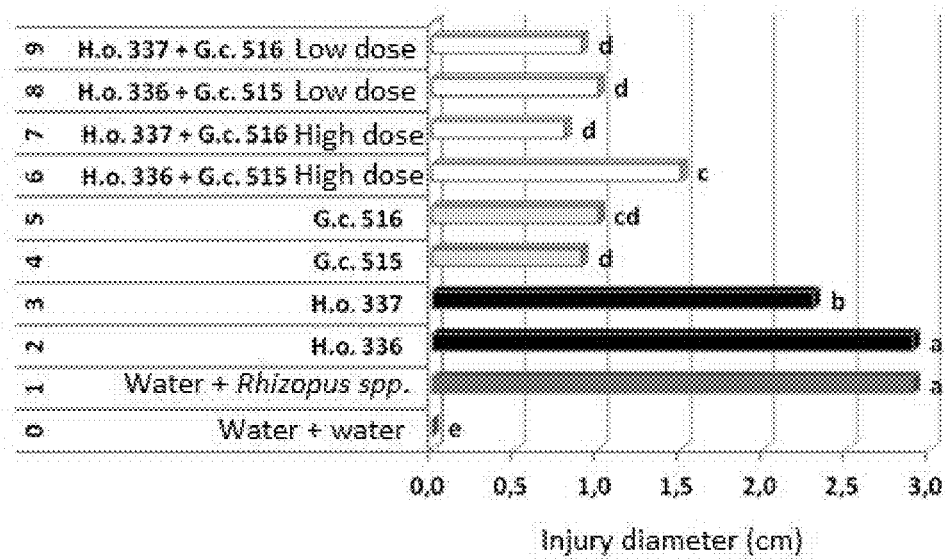
Figure 2:
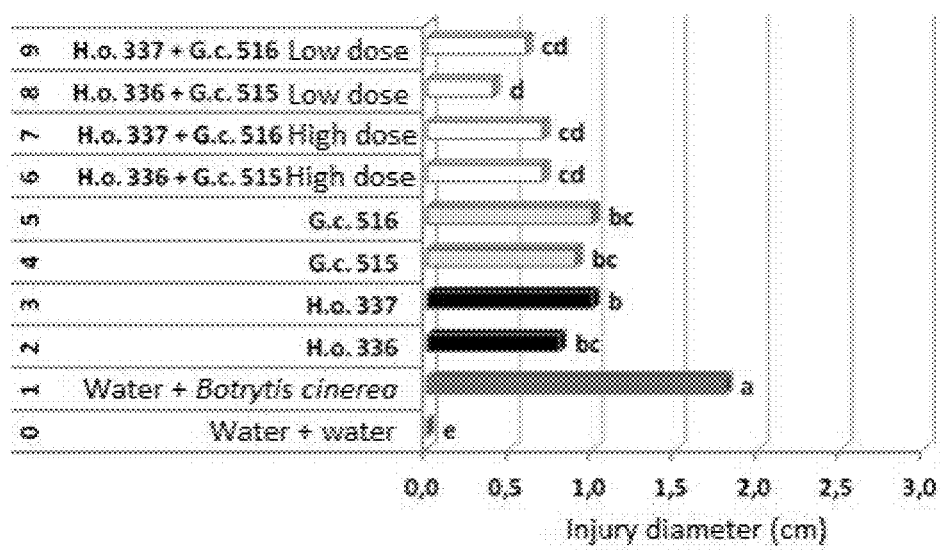
FIG. 2 shows a Treatment graph v/s injury Diameter (cm), where the effect of the treatment with *Gluconobacter cerinus* (G.c.) (strain 515 and 516) and/or *Hanseniaspora osmophila* (H.o.) (strain 336 and 337) is observed on the development of *Botrytis cinerea* in grape berries cv Red Globe. Bars represent the injury diameter that causes the infection of *Botrytis cinerea* in grape berries against the different treatments. The figure shows the effects at 4 (A) and 15 (B) days after infection with the pathogenic fungus. The doses are the same as those described for FIG. 1. The positive control corresponds to the treatment of Water+*Botrytis cinerea* (complete injury) and the negative control corresponds to the treatment of Water+Water (absence of injury). Letters to the right of the bars correspond to different categories according to the Tukey test ($p \leq 0.05$).
Figure 2:
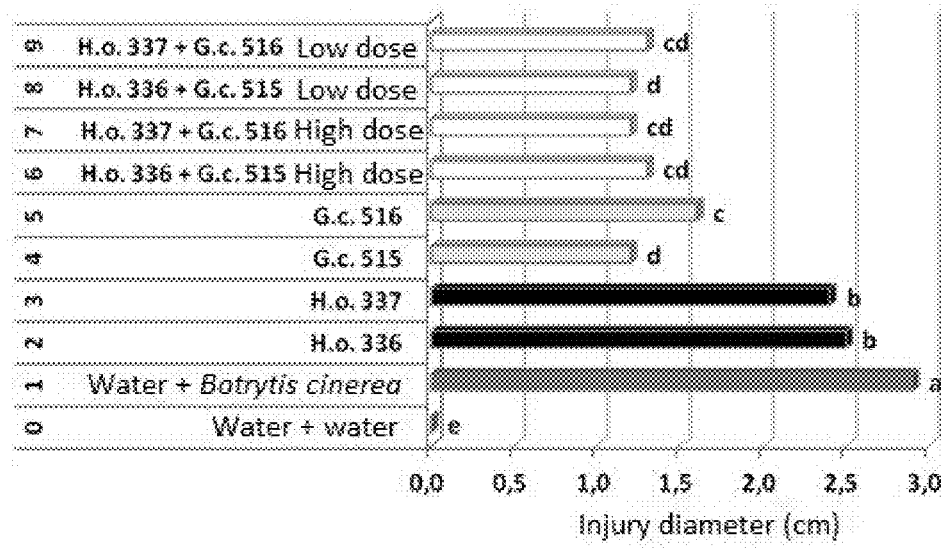
Figure 3:
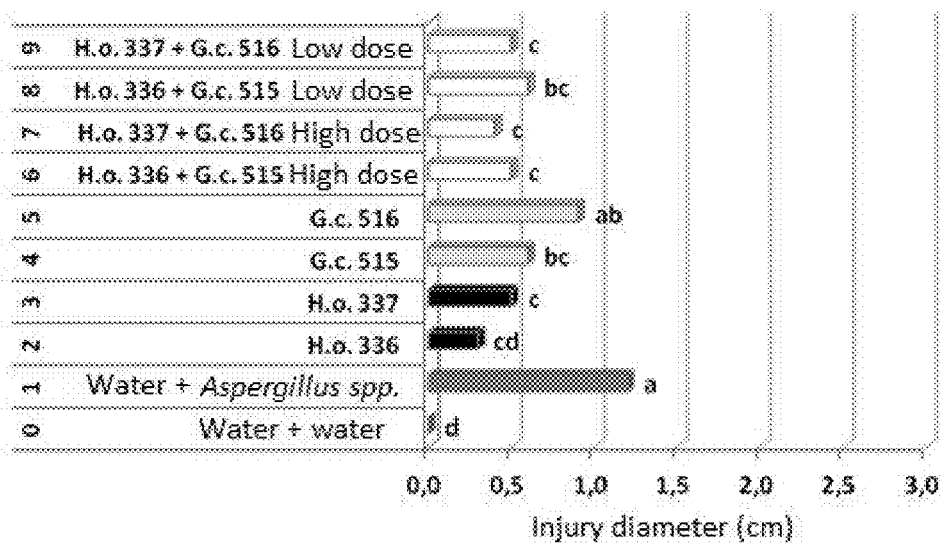
FIG. 3 shows a Treatment graph v/s Diameter injury (cm), where the effect of the treatment with *Gluconobacter cerinus* (G.c.) (strain 515 and 516) and/or *Hanseniaspora osmophila* (H.o.) (strain 336 and 337) is observed on the development of *Aspergillus* spp. in grape berries cv Red Globe. Bars represent the injury diameter generated by the infection of *Aspergillus* spp. in grape berries against the different treatments. The figure shows the effects at 4 (A) and 15 (B) days after infection with pathogenic fungus. The doses are the same as those described for FIG. 1. The positive control corresponds to the treatment of Water+*Aspergillus* spp. (complete injury) and the negative control corresponds to the Water+Water treatment (absence of injury). Letters to the right of the bars correspond to different categories according to the Tukey test ($p \leq 0.05$).
Figure 3:
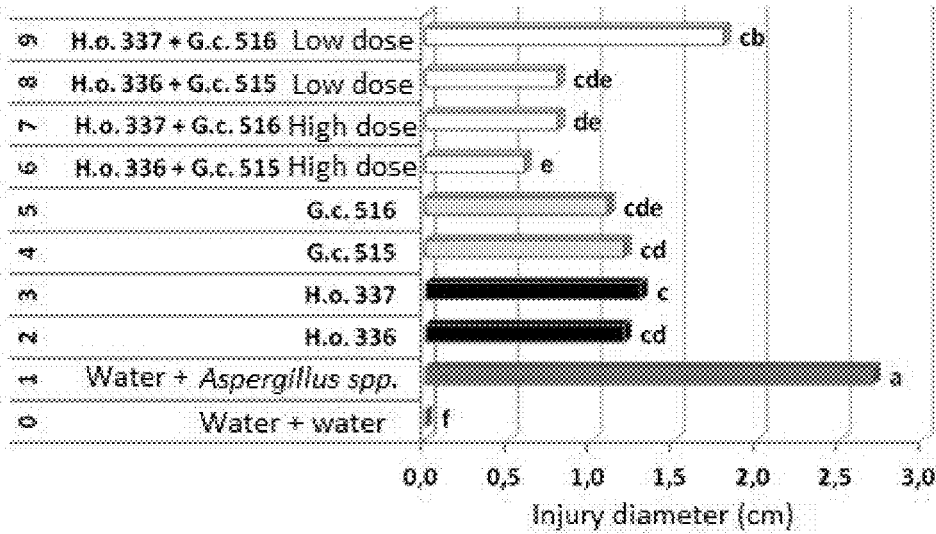
Figure 4:
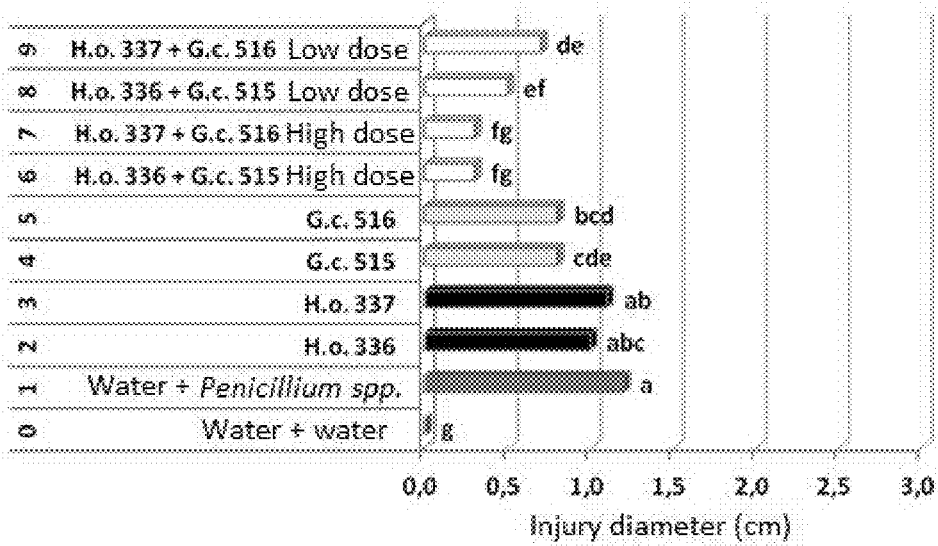
FIG. 4 shows a Treatment graph v/s injury Diameter (cm), where the effect of treatment with *Gluconobacter cerinus* (G.c.) (strain 515 and 516) and/or *Hanseniaspora osmophila* (H.o.) (strain 336 and 337) is observed on the development of *Penicillium* spp. in grape berries cv Red Globe. The bars represent the injury diameter generated by the infection of *Penicillium* spp. in grape berries against the different treatments. The figure shows the effects at 4 (A) and 15 (B) days after infection with pathogenic fungus. The doses are the same as those described for FIG. 1. The positive control corresponds to the treatment of Water+*Penicillium* spp. (complete injury) and the negative control corresponds to the Water+Water treatment (absence of injury). Letters to the right of the bars correspond to different categories according to the Tukey test ($p \leq 0.05$).
Figure 4:
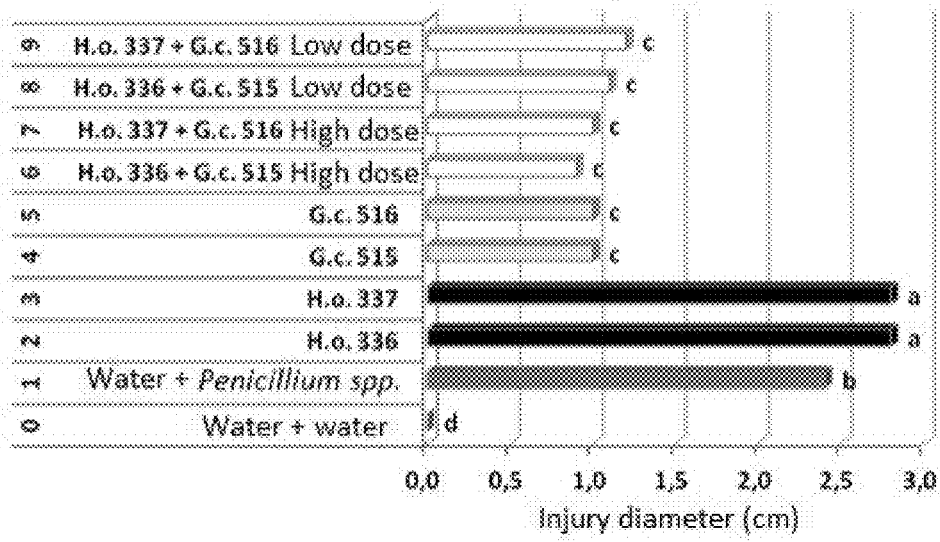
Figure 5:
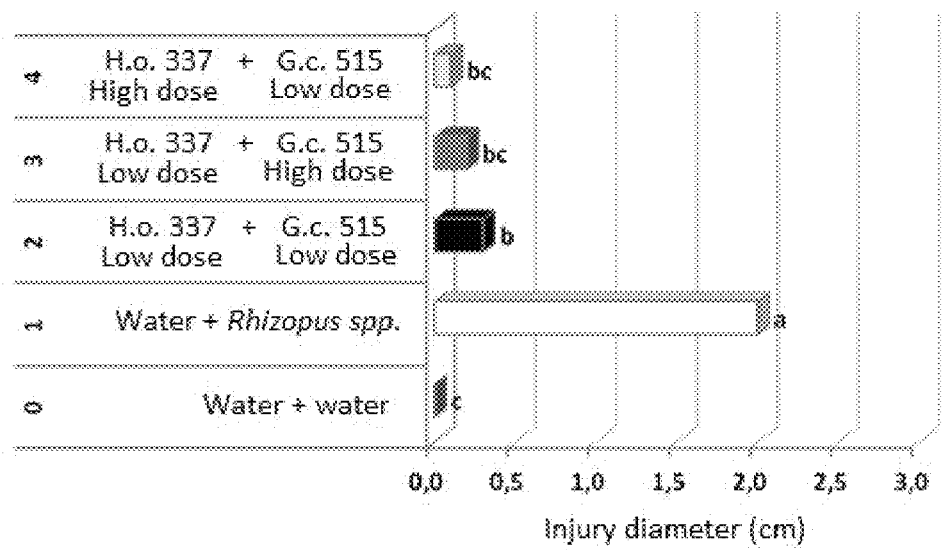
FIG. 5 shows a Treatment graph v/s injury Diameter (cm), where the effect of treatment with different concentrations (doses) of *Gluconobacter cerinus* (G.c.) strain 515 and *Hanseniaspora osmophila* (H.o.) strain 337 on the development of *Rhizopus* spp. in grape berries cv Red Globe. The bars represent the injury diameter generated by *Rhizopus* spp. infection in grape berries against the different embodiments of the disclosure. The figure shows the effects at 4 (A) and 20 (B) days after infection with the pathogenic fungus. The concentrations of used *Gluconobacter cerinus* (strain 515) are: High dose ($1 \times 10^8$ [UFC/ml]) and Low dose ($1 \times 10^6$ [UFC/ml]). The used concentrations of *Hanseniaspora osmophila* (strain 337) are: High dose ($1 \times 10^6$ [UFC/ml]) and Low dose ($1 \times 10^4$ [UFC/ml]). For treatment 2, Low doses were used for *Gluconobacter cerinus* and *Hanseniaspora osmophila*. Grape berries were inoculated with $1 \times 10^5$ [spores/ml] *Rhizopus* spp. The positive control corresponds to the treatment of Water+*Rhizopus* spp. (complete injury) and the negative control corresponds to the Water+Water treatment (absence of injury). Letters to the right of the bars correspond to different categories according to the Tukey test ($p \leq 0.05$).
Figure 5:
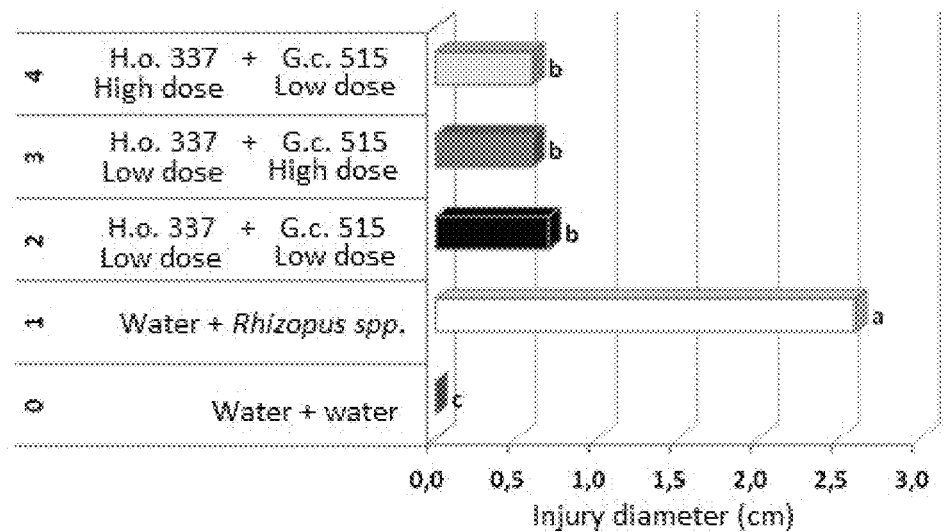
Figure 6:
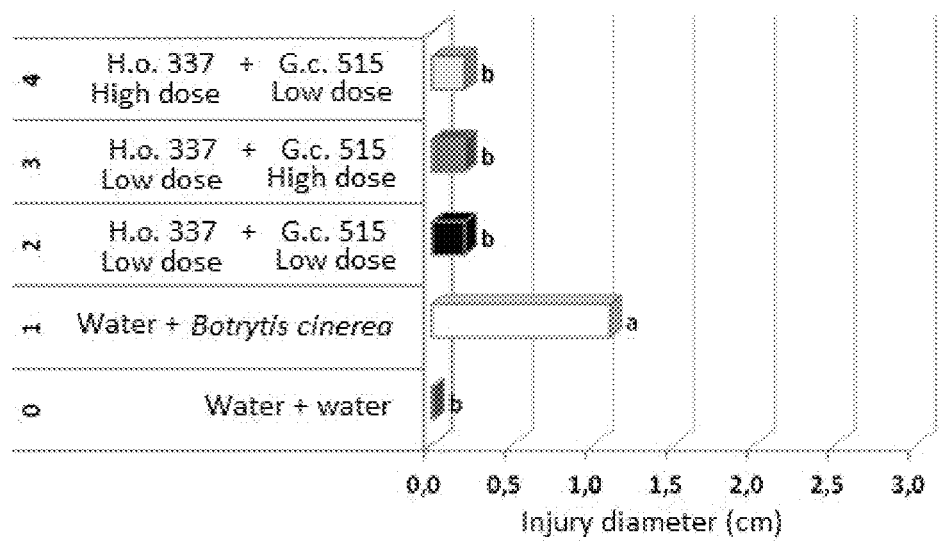
FIG. 6 shows a Treatment graph v/s injury Diameter (cm), where the effect of treatment with different concentrations (doses) of *Gluconobacter cerinus* (G.c.) strain 515 and *Hanseniaspora osmophila* (H.o.) strain 337 on the development of *Botrytis cinerea* in grape berries cv Red Globe. Bars represent the injury diameter generated by the infection of *Botrytis cinerea* in grape berries against different embodiments of the disclosure. The figure shows the effects at 4 (A) and 20 (B) days after infection with the pathogenic fungus.
Figure 6:
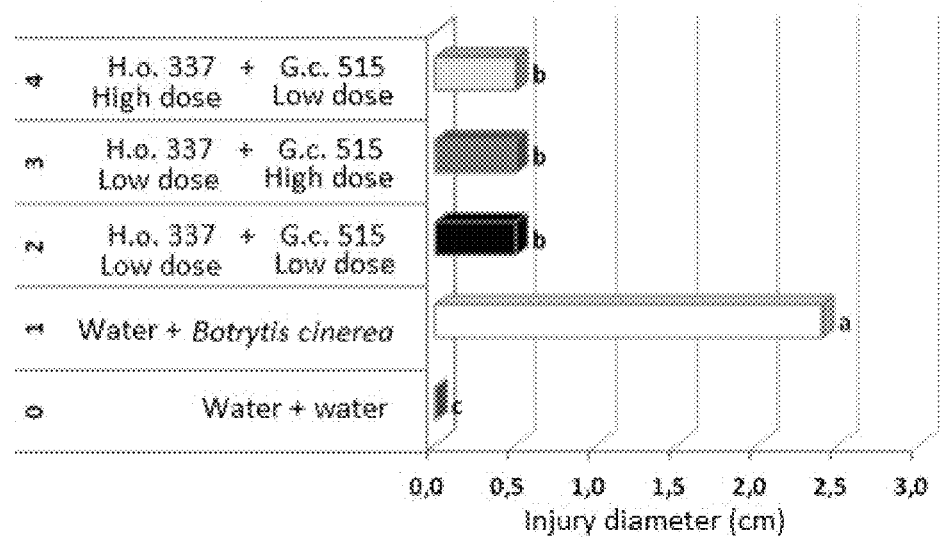

The doses are the same as those described for FIG. 5. The positive control corresponds to the treatment of Water+*Botrytis cinerea* (complete injury) and the negative control corresponds to the treatment of Water+Water (absence of injury). Letters to the right of the bars correspond to different categories according to the Tukey test (p≤0.05).

Figure 7:
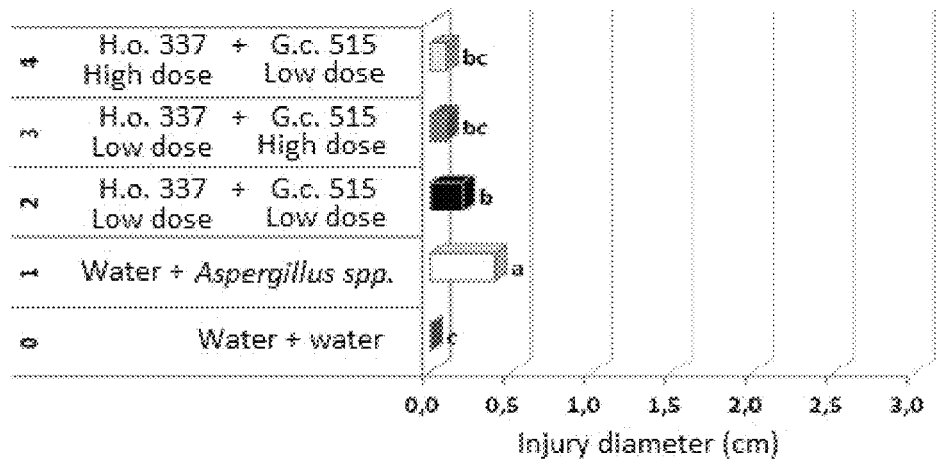
Figure 7:
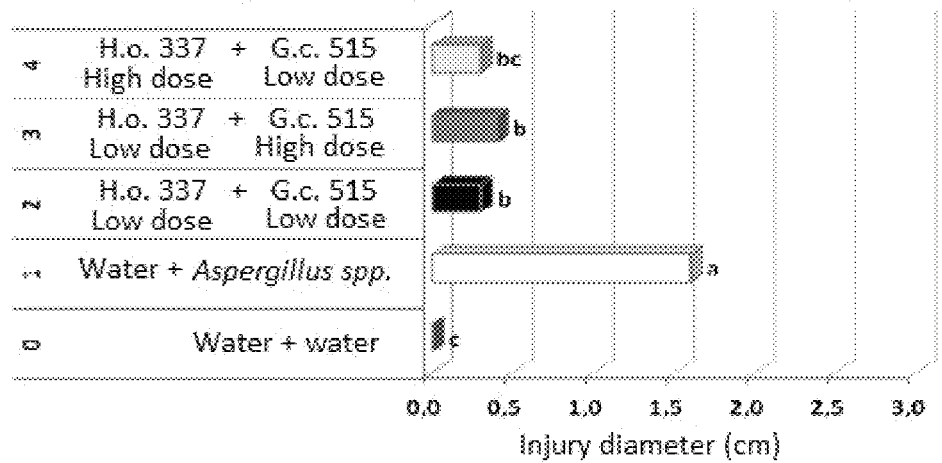

FIG. 7 shows a Treatment graph v/s injury Diameter (cm), where the effect of treatment with different concentrations (dose) of *Gluconobacter cerinus* (G.c.) strain 515 and *Hanseniaspora osmophila* (H.o.) strain 337 on the development of *Aspergillus* spp. in grape berries cv Red Globe. Bars represent the diameter of the injury generated by the infection of *Aspergillus* spp. in grape berries against different embodiments of the disclosure. The figure shows the effects at 4 (A) and 20 (B) days after infection with the pathogenic fungus. The doses are the same as those described for FIG. 5. The positive control corresponds to the treatment of Water+*Aspergillus* spp. (complete injury) and the negative control corresponds to the Water+Water treatment (absence of injury). Letters to the right of the bars correspond to different categories according to the Tukey test (p≤0.05).

Figure 8:
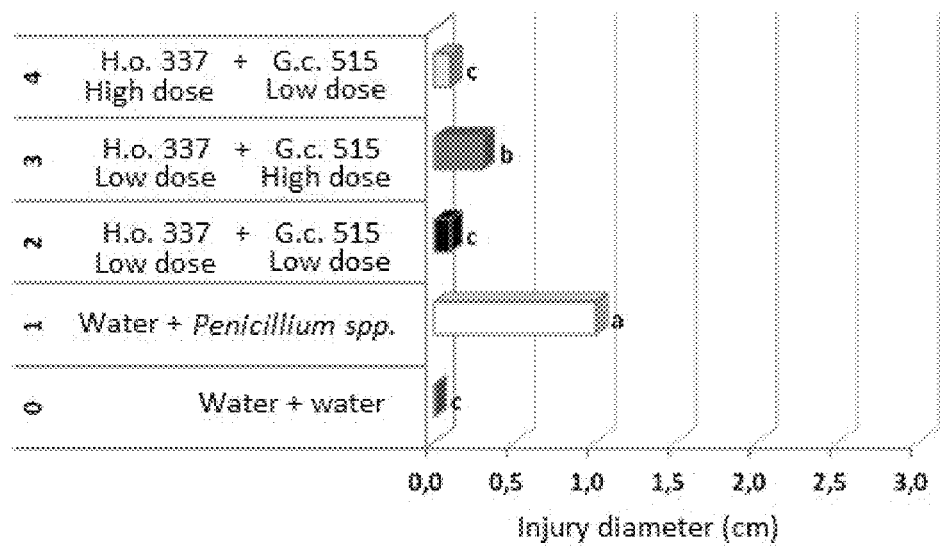
Figure 8:
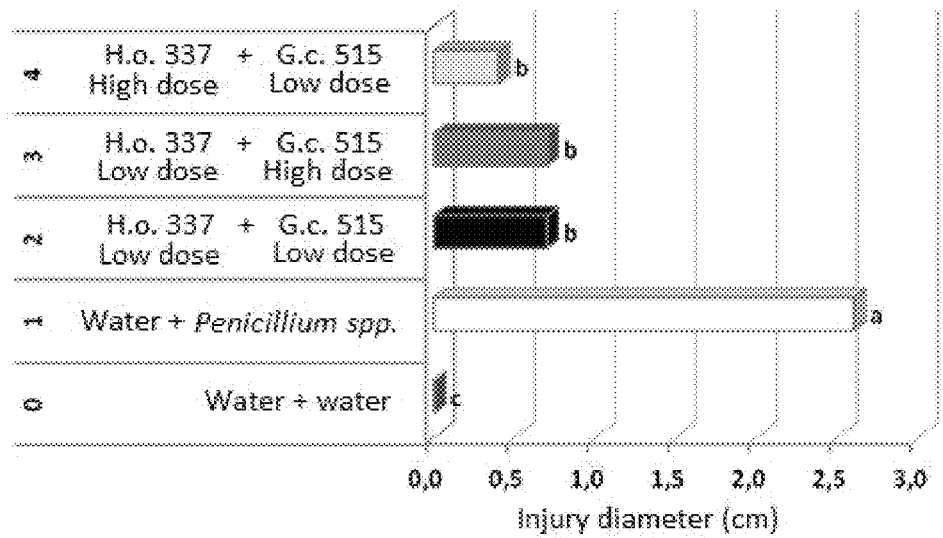

FIG. 8 shows a Treatment graph v/s injury Diameter (cm), where the effect of the treatment with different concentrations (dose) of *Gluconobacter cerinus* (G. c.) strain 515 and *Hanseniaspora osmophila* (H.o.) strain 337 on the development of *Penicillium* spp. in grape berries cv Red Globe. Bars represent the diameter of the injury generated by the infection of *Penicillium* spp. in grape berries against different embodiments of the disclosure. The figure shows the effects at 4 (A) and 20 (B) days after infection with the pathogenic fungus. The doses are the same as those described for FIG. 5. The positive control corresponds to the treatment of Water+*Penicillium* spp. (complete injury) and the negative control corresponds to the Water+Water treatment (absence of injury). Letters to the right of the bars correspond to different categories according to the Tukey test (p≤0.05).

Figure 9:
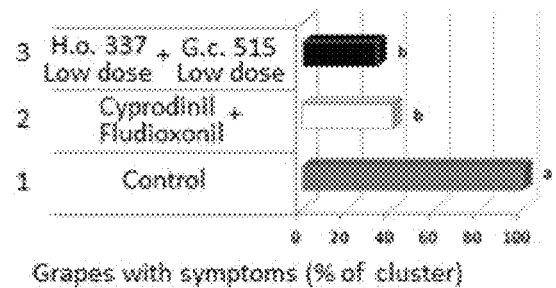
Figure 9:
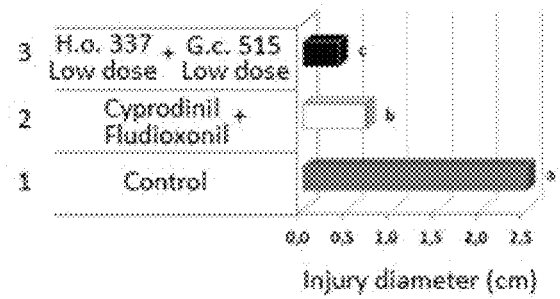
Figure 9:
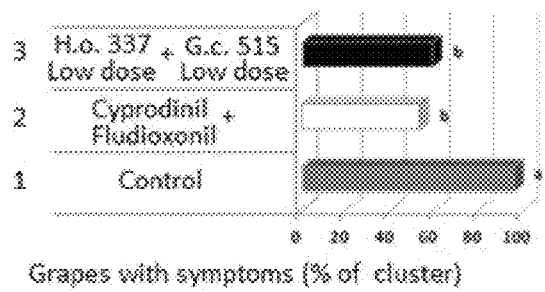
Figure 9:
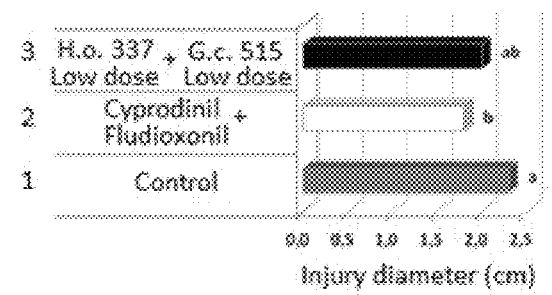

FIG. 9 shows a Treatment graph v/s injury Diameter (cm), where the effect of the biological product of the disclosure and a standard commercial treatment on the incidence (A and C) and severity (B and D) of the cluster rot (pathology caused by *Rhizopus* spp., *Botrytis cinerea*, *Aspergillus* spp., and/or *Penicillium* spp.) in cv Red Globe table grapes that presented wounds (A and B) or that did not present them (C and D). In each experiment, 10 different clusters were analyzed, each with 10 berries. Bars represent the percentage of grapes with symptoms in the analyzed cluster (A and C) or the injury diameter that generates the infection in the grape caused by cluster rot (B and D). Data were obtained at 5 days post infection, and at an incubation of 24° C. *Gluconobacter cerinus* (G.c.) concentration, strain 515 was $1\times10^6$ [CFU/ml] and that of *Hanseniaspora osmophila* (H.o.) strain 337 was $1\times10^4$ [CFU/ml]. The commercial standard was Switch 0 62.5 wg which is formulated: Cyprodinil (37.5% p/p) plus Fludioxinil (25% w/w). The control corresponds to cv Red Globe table grapes without treatment. Letters to the right of the bars correspond to different categories according to the Tukey test (p≤0.05).

Figure 10:
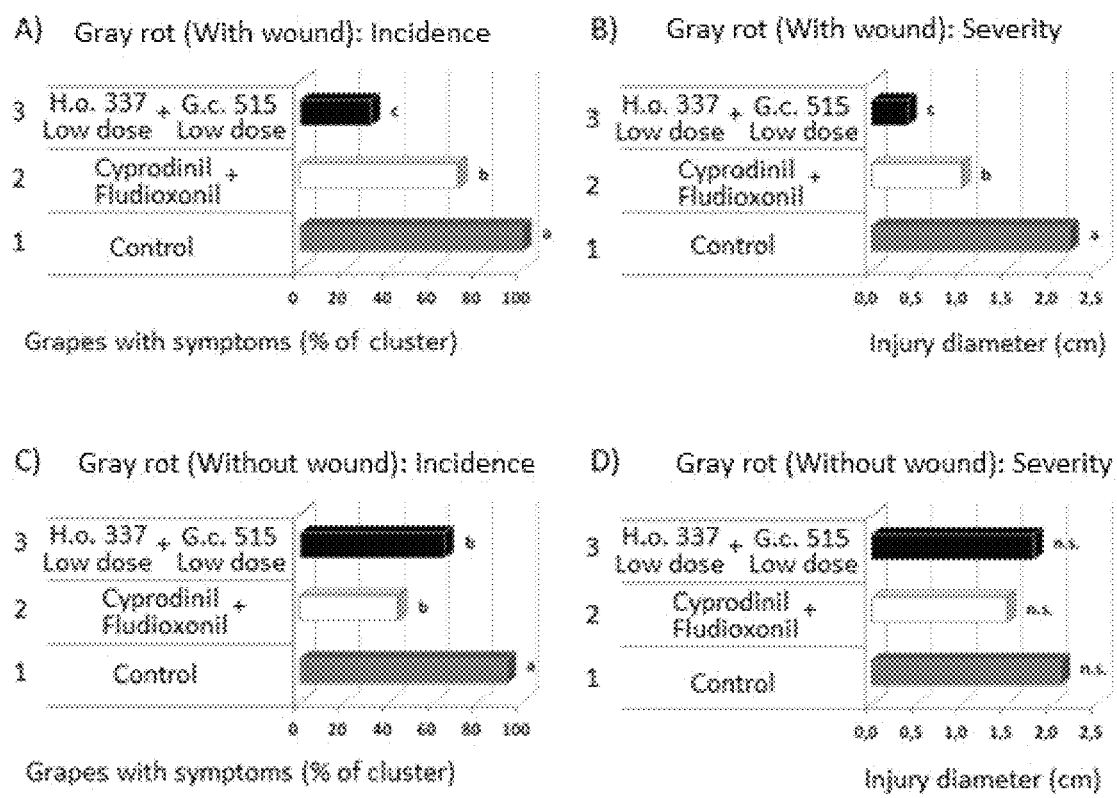

FIG. 10 shows a Treatment graph v/s Diameter injury (cm), where it is compared the effect of the biological product of the disclosure and a standard commercial treatment on the incidence (A and C) and severity (B and D) of gray rot (pathology produced by *Botrytis cinerea*) in cv Red Globe table grapes that presented injuries (A and B) or that did not present them (C and D). In each experiment, 10 different clusters were analyzed, each with 10 berries. The bars represent the percentage of grapes with symptoms in the analyzed cluster (A and C) or the injury diameter generating the infection in grape caused by gray rot (B and D). Data were obtained at 5 days post infection, and at an incubation of 24° C. The doses are the same as those described for FIG. 9. The commercial standard was Switch® 62.5 wg which is formulated: Cyprodinil (37.5% w/w) plus Fludioxinil (25% w/w). The control corresponds to cv Red Globe table grapes without treatment. Letters to the right of bars correspond to different categories according to the Tukey test (p≤0.05).

Figure 11:
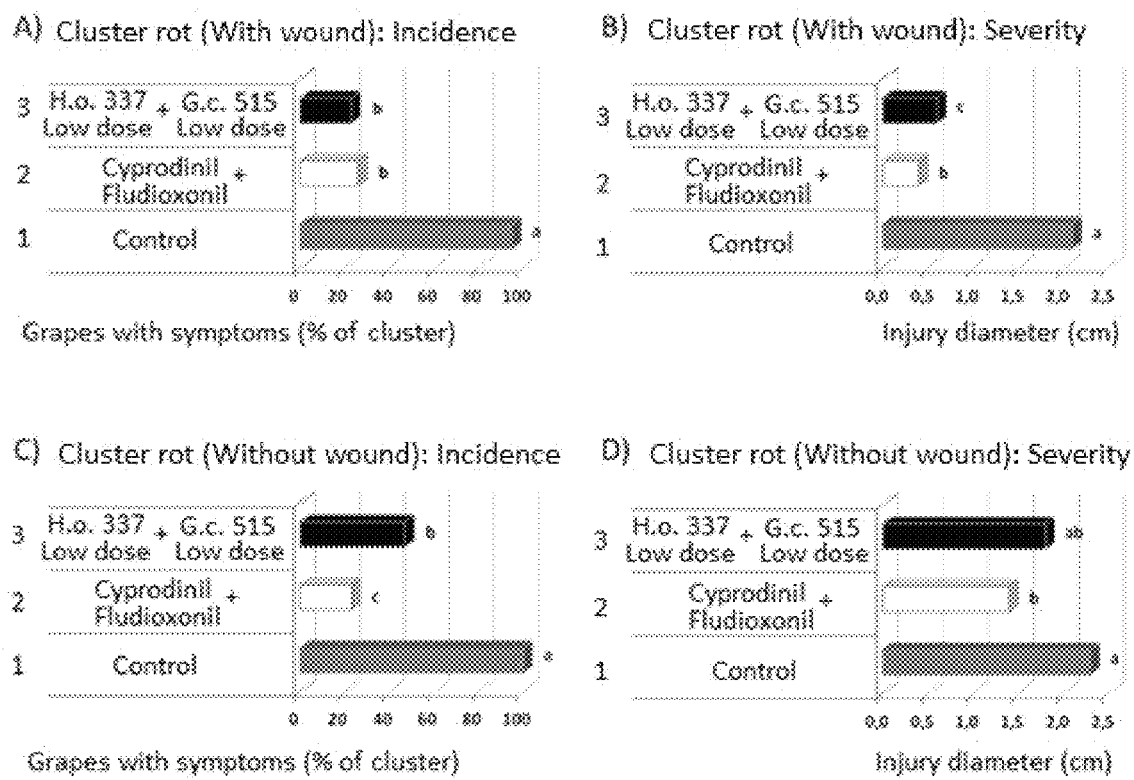

FIG. 11 shows a Treatment graph v/s injury Diameter (cm), where it is compared the effect of the biological product of the disclosure and a standard commercial treatment on the incidence (A and C) and severity (B and D) of the cluster rot (pathology produced by *Rhizopus* spp., *Botrytis cinerea*, *Aspergillus* spp., and/or *Penicillium* spp.) in cv Red Globe table grape after a cold shock. We evaluated grapes that presented wounds (A and B) and grapes that did not present them (C and D). Bars represent the percentage of grapes with symptoms in the analyzed cluster (A and C) or the injury diameter generating the infection in the grape caused by cluster rot (B and D). Data were obtained at 5 days post infection, and at an incubation of 0° C., followed by 6 days at room temperature. The doses are the same as those described for FIG. 9. The commercial standard was Switch® 62.5 wg which is formulated: Cyprodinil (37.5% w/w) plus Fludioxinil (25% w/w). The control corresponds to cv Red Globe table grapes without treatment. Letters to the right of the bars correspond to different categories according to the Tukey test (p≤0.05).

Figure 12:
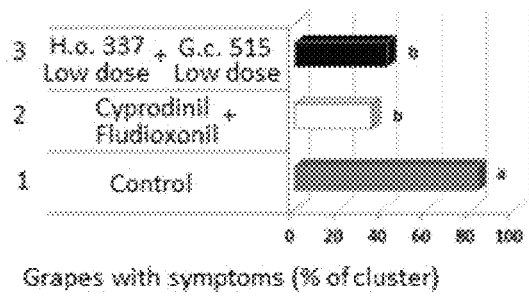
Figure 12:
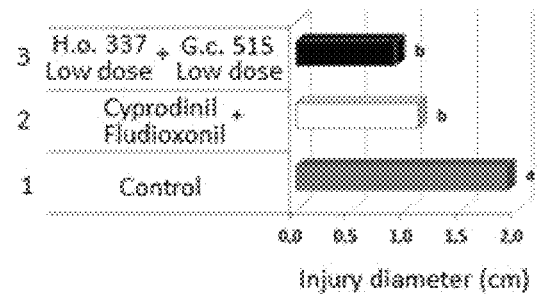
Figure 12:
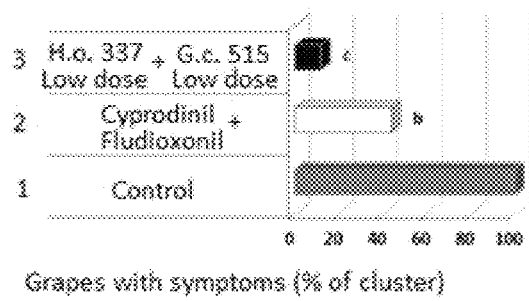
Figure 12:
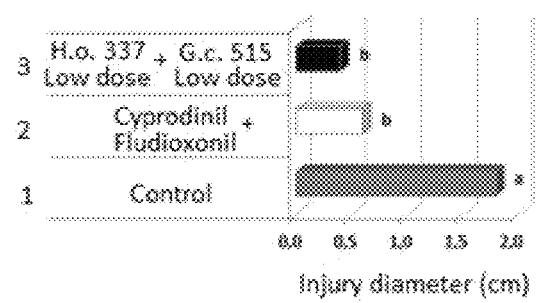

FIG. 12 shows a Treatment graph v/s injury Diameter (cm), where it is compared the effect of the biological product of the disclosure and a standard commercial treatment on the incidence (A and C) and severity (B and D) of the gray rot (pathology produced by *Botrytis cinerea*) in cv Red Globe table grape after a cold shock. We evaluated grapes that presented wounds (A and B) and grapes that did not present them (C and D). Bars represent the percentage of grapes with symptoms in the analyzed cluster (A and C) or injury diameter that generates the infection in the grape caused by gray rot (B and D). Data were obtained at 5 days post infection, and at an incubation of 0° C., followed by 6 days at room temperature. The doses are the same as those described for FIG. 9. The commercial standard was Switch® 62.5 wg which is formulated: Cyprodinil (37.5% w/w) plus Fludioxinil (25% w/w). The control corresponds to cv Red Globe table grapes without treatment. Letters to the right of the bars correspond to different categories according to the Tukey test (p≤0.05).

DETAILED DESCRIPTION

The present disclosure relates to a biological product (i.e. composition) comprising a *Gluconobacter* bacteria, preferably *Gluconobacter cerinus*, more preferably *Gluconobacter cerinus* strain 515 access code RGM2215, deposited in the Chilean Collection of Microbial Genetic Resources, combined with the *Hanseniaspora* yeast, preferably *Hanseniaspora osmophila*, more preferably *Hanseniaspora osmophila* strain 337 access code RGM2214, deposited in the Chilean Collection of Microbial Genetic Resources. These microorganisms were isolated from berries coming from clusters of table grapes, harvested in farms with commercial production intended for export.

Inventors found that, surprisingly, the *Gluconobacter* bacteria of the disclosure has an antifungal effect evident in fungi of different types, including *Rhizopus* spp., *Botrytis cinerea*, *Aspergillus* spp. and *Penicillium* spp. More surprisingly, the inventors observed that the addition of the *Hanseniaspora* yeast synergistically potentiated the antifungal effect of *Gluconobacter*. This effect can not be inferred from the mere reading of the state of the art since there are no documents that disclose that *Hanseniaspora osmophila* has antifungal activity, much less that it synergistically potentiates the antifungal activity of *Gluconobacter*.

On the other hand, the biological product of the disclosure (i.e. *Gluconobacter+Hanseniaspora*) exhibits a sustained antifungal effect over time, even several days after inoculation. In addition, the antifungal effect obtained with the biological product of the disclosure is as or more effective than the effects obtained with synthetic antifungals, even in conditions of shocks and cold chains, so common in fruit and vegetable packaging for their preservation. For all these reasons, the antifungal biological product of the disclosure is effective and does not have the disadvantages of synthetic antifungal products.

Therefore, the present disclosure relates to an antifungal product comprising *Gluconobacter* and *Hanseniaspora*, which have a surprisingly synergistic and potentiated effect of antifungal activity. In addition, it is as or more effective than synthetic antifungal compounds, but it is a natural product, solving a technical problem that has not been satisfactorily resolved at present.

Then follows a description of preferred embodiments of the disclosure.

The words "a" or "an" are intended to cover one or more, unless otherwise specified.

In one aspect, the disclosure relates to a biological product comprising a bacteria of *Gluconobacter* genus and yeast of the *Hanseniaspora* genus. *Gluconobacter* spp. can be grown in culture medium GYC (glucose 50 [g/L], yeast extract 10 [g/L], calcium carbonate 30 [g/L], agar 25 [g/L], hydrochloric acid 2 [N] and distilled water 1 L) at 25° C. In addition, any other form of culture suitable for *Gluconobacter* spp. will be useful for the purpose of this disclosure. Meanwhile, *Hanseniaspora* spp. can be grown in MLP culture medium (peptone 20 [g/L], honey from bees 80 [g/L], agar 20 [g/L], distilled water 1 L) at 25° C. As for *Gluconobacter* spp., any other cultivation form suitable for *Hanseniaspora* spp. it will be useful for the purpose of the present disclosure.

To obtain the product of present disclosure, it is necessary to mix *Gluconobacter* spp., preferably *Gluconobacter cerinus*, more preferably *Gluconobacter cerinus* 515 access code RGM2215, deposited in the Chilean Collection of Microbial Genetic Resources, with *Hanseniaspora* spp., preferably *Hanseniaspora osmophila*, more preferably strain 337 access code RGM2214, deposited in the Chilean Collection of Microbial Genetic Resources. Microorganisms should be mixed in a ratio of at least $1 \times 10^6$ [CFU/ml] of *Gluconobacter* and at least $1 \times 10^4$ [CFU/ml] of *Hanseniaspora*, preferably $1 \times 10^6$ [CFU/ml] to $1 \times 10^8$ [CFU/ml] of *Gluconobacter* and $1 \times 10^4$ [CFU/ml] to $1 \times 10^6$ [CFU/ml] of *Hanseniaspora*. In order to estimate the number of CFUs, the method of counting viable microorganisms in plaque, or some other method suitable for this purpose, may be used. In order to mix the microorganisms of the disclosure, these may be suspended in culture medium (as described in the preceding paragraphs) or in any other suitable vehicle, such as physiological saline solution (0.85% NaCl), phosphate buffer (PBS), peptone water, water with agar, or sterile water. Alternatively, the microorganisms of the disclosure may be mixed lyophilized or lyophilized after being mixed.

In another aspect, the disclosure comprises a method for the control of fungal diseases in plants, which in turn comprises administering the biological product to a plant organism. To administer the biological product of the disclosure, it can be made directly on plants, including on stems, leaves, fruits and buds. Alternatively, the product of the disclosure may be added directly onto the farmland, either mixed with the irrigated waters or alone. Alternatively, the product of the disclosure may be added on seeds before being stored or before being planted. To administer the product of the disclosure, any means is suitable, including administrations in liquid vehicles (direct jet, spray, mixed with irrigated waters) or directly as powder in the case of being used lyophilized. The use of means with a gel or foam consistency to contain the biological product described in the present application is also considered within the scope to protect the present disclosure.

In another aspect of the disclosure, the biological product with antifungal properties may be used to treat, prevent, control or cure fungal diseases in plants. Accordingly, the present disclosure includes the prophylactic use of the product on healthy stems, leaves, fruits, and seeds, and even on land to be cultivated. In addition, the use of the product of the disclosure on stems, leaves, fruits and seeds that present any symptom of disease is included.

Additionally, the disclosure encompasses the use of a biological product comprising a bacteria of *Gluconobacter* genus and a yeast of *Hanseniaspora* genus, because it is useful to treat, prevent, control or cure fungal diseases in plants. In one embodiment, diseases susceptible to being treated, prevented or cured by using the product of the present disclosure include fungal diseases produced by Deuteromycota, including diseases caused by *Aspergillus* spp., *Penicilium* spp., *Botrytis* spp., among others. In addition, the present disclosure can be used to treat, prevent, control or cure fungal diseases in plants produced by Zygomycota, including *Rhizopus*, among others. Additionally, the product of the disclosure can be used in fruit plants such as vines, pomegranates, prunus, citrus fruits and berries; fruit vegetables such as tomatoes, paprika, eggplant, zucchini; and leafy vegetables such as lettuce, chard, and spinach.

Finally, the biological product of the disclosure can be used to treat, prevent, control or cure acid rot or cluster rot and gray rot, among other fungal diseases.

The disclosure will be better understood by means of the following examples, which are merely illustrative and not limiting the disclosure scope. Various changes and modifications to the described embodiments will be apparent for the experts in this subject and such changes can be made without departing from the spirit of the disclosure and scope of the attached claims.

EXAMPLES

Example 1: Preparation of the Biological Product of the Disclosure and Protocols of Biological Assays A.—Preparation of *Gluconobacter cerinus* (Strain 515 and 516)

The bacteria was cultured in the GYC culture medium (Glucose 50 [g/L], Yeast Extract 10 [g/L], Calcium Carbonate 30 [g/L], Agar 25 [g/L], Hydrochloric Acid 2 [N], complete 1 L with distilled water) for 5 days at 25° C. Once grown, the bacteria was extracted from the culture medium and diluted in water plus 1% agar and 20% tween to break surface tension, leaving the bacteria at the appropriate concentration (Table 1). The grape berries were inoculated with 10 µl of bacterial suspension. As a negative control, 10 µl of water was used instead of *Gluconobacter*.

TABLE 1

| Concentrations used to inoculate vegetables | |
|---|---|
| Microorganism | Concentration |
| *Gluconobacter cerinus* | $1 \times 10^8$ [CFU/ml] (High dose) |
| | $1 \times 10^6$ [CFU/ml] (Low dose) |
| *Hanseniaspora osmophila* | $1 \times 10^6$ [CFU/ml] (High dose) |
| | $1 \times 10^4$ [CFU/ml] (Low dose) |
| Pathogenic fungi | $1 \times 10^5$ [spores/ml] |

B.—Preparation of *Hanseniaspora osmophila* (Strain 336 and 337))

The yeast was cultured in the MLP culture medium (Peptone 20 [g/L], Honey bees 80 [g/L], Agar 20 [g/L], complete 1 L with distilled water) for 5 days at 25° C. Once grown, the yeast is extracted from the culture medium and diluted in water plus 1% agar and 20% tween to break surface tension, leaving the yeast at the appropriate concentration (Table 1). The grape berries were inoculated with 10 μl of yeast suspension. As a negative control, 10 μl of water was used instead of *Hanseniaspora*.

C.—Preparation of the Biological Product Comprising *Gluconobacter* and *Hanseniaspora*.

To prepare the product of the disclosure, volumes of concentrated solution were mixed with *Gluconobacter* and another concentrated *Hanseniaspora* solution. To achieve the desired concentration, according to Table 1, the calculation was made of $C1*V1=C2*V2$, where C1 is the initial concentration of solution; V1 is the initial volume of the solution; C2 is the final concentration of the solution and V2 is the final volume of the solution. So a volume of solution was taken according to the result of calculation and diluted by mixing *Gluconobacter* and *Hanseniaspora* in a single solution.

The grape berries were inoculated with 10 μl of microbiological suspension. As a negative control, 10 μl of water was used instead of biological product.

D.—Infection with the Pathogenic Fungi *Rhizopus* spp., *Botrytis cinerea*, *Aspergillus* spp. and/or *Penicillium* spp.

The pathogenic fungi *Rhizopus* spp., *Botrytis cinerea*, *Aspergillus* spp. and/or *Penicillium* spp. were grown in PDA 39 [g/L] Difco™ medium for 7 days at 24° C. for *Rhizopus* spp., *Aspergillus* spp. and/or *Penicillium* spp. and for 10 days at 24° C., under black light (320 nm) for *Botrytis cinerea*. Then, 10 μl ($1\times10^5$ [spores/ml]) (Table 1) were used to inoculate the grape berries. As a negative control, 10 μl of water was used instead of spore suspension of pathogenic fungi.

E.—Preparation of Commercial Synthetic Antifungal for Standard Use (Cyprodinil+Fludioxinil).

Cyprodinil+fludioxinil corresponds to commercial product Switch® 62.5 wg which is formulated: Ciprodinil 37.5% w/w+Fludioxinil 25% w/w. The applied dose was 10 μl (90 g per 100 L of water).

F.—Determination of Antifungal Effect.

To determine the antifungal effect of the biological product of present disclosure and of its controls, cv Red Globe berries were infected with pathogenic fungi according to what is indicated in point D, concomitantly with the addition of antifungal compositions according to points A, B, C or E. In the case of FIGS. 1 to 8, the infected berries were incubated for 4 days at 24° C., and the subsequent days until completing 15 or 20 days, at room temperature. In the case of FIGS. 9 and 10, the infected berries were incubated 5 days at 24° C. In the case of FIGS. 11 and 12, the infected berries were incubated 5 days at 0° C. and then 6 days at room temperature. For FIGS. 9A, 9B, 10A, 10B, 11A, 11B, 12A and 12B, berries with or without wounds were analyzed. The wounds, approximately 2 mm deep, were made in grape berries by researchers.

The antifungal effect was determined after the incubation, measuring the diameter of the lesions produced by the pathogenic fungi (severity estimation) or calculating the percentage of affected berries in a given cluster (incidence index).

Example 2: *Gluconobacter* spp. and *Hanseniaspora* spp. Present a Synergistic Antifungal Effect Against *Rhizopus* spp., *Botrytis cinerea*, *Aspergillus* spp. and *Penicillium* spp.

In order to determine the antifungal effect of *Gluconobacter* and *Hanseniaspora*, a challenge was performed using *Rhizopus* spp. (FIG. 1), *Botrytis cinerea* (FIG. 2), *Aspergillus* spp. (FIG. 3) or *Penicillium* spp. (FIG. 4) as pathogenic fungi. The pathogenic fungi were grown and used to infect berries of cv Red Globe. Grapes as explained in Example 1. At the same time of infection, water was added (negative control treatment), *Hanseniaspora osmophila* alone (strain 336 or strain 337), *Gluconobacter cerinus* alone (strain 515 or strain 516), or a combination of *Gluconobacter* and *Hanseniaspora* in different concentrations (Table 1). The antifungal effect was estimated as the injury diameter after 4 days (FIG. 1A, 2A, 3A, 4A) or after 15 days post infection (FIG. 1B, 2B, 3B, 4B). The experiment was repeated 3 times (biological replicate) and each time 5 different berries were analyzed. The results allowed the treatments categorization according to statistical analysis (Tukey test $p \leq 0.05$).

According to our results, it is clearly observed that at 4 days post infection, none of the strains of *Hanseniaspora osmophila* is able to decrease the injuries diameters produced by *Rhizopus* spp. (FIG. 1A). Moreover, it is observed that both strains of *Gluconobacter cerinus* tested exerted a significant effect in reducing injury from *Rhizopus* spp., Where *Gluconobacter cerinus* strain 515 exerted a slightly higher strain 516 effect (FIG. 1A). More importantly, the biological product of the disclosure (which comprises *Gluconobacter cerinus*+*Hanseniaspora osmophila*) has a clear enhanced synergistic effect in relation to the effect obtained by its individual parts (FIG. 1A). This is evidenced by the fact that *Hanseniaspora osmophila* evidently improves the antifungal properties of *Gluconobacter cerinus*, even though *Hanseniaspora osmophila* alone has no antifungal effect against *Rhizopus* spp. (FIG. 1A). The product of the disclosure also exerts an enhanced antifungal effect against *Botrytis cinerea* (FIG. 2A), *Aspergillus* spp. (FIG. 3A) and against *Penicillium* spp. (FIG. 4A). The enhanced synergistic effect of the biological product of the disclosure is especially evident for the treatment of *Penicillium* spp., where *Hanseniaspora osmophila* and *Gluconobacter cerinus* exhibit a weak antifungal effect on their own, which is clearly observed to be increased and improved when both microorganisms are mixed (FIG. 4A).

In light of these results it is possible to conclude that *Hanseniaspora* synergistically potentiates the antifungal effects of *Gluconobacter*. Therefore, the biological product of the disclosure has a surprising effect impossible to determine without empirical data disclosed in the present application.

Example 3: Different Concentrations of *Gluconobacter* spp. and *Hanseniaspora* spp. Present a Synergistic Antifungal Effect Against *Rhizopus* spp., *Botrytis cinerea*, *Aspergillus* spp. and *Penicillium* spp. Sustained Over Time In order to find out if the antifungal effect produced by the present disclosure is sustained over time, a challenge was carried out as described in Example 2, but evaluating injuries size after 15 days post infection. As seen in FIGS. 1B, 2B, 3B and 4B, the present disclosure still keeps its antifungal properties against *Rhizopus* spp., *Botrytis cinerea*, *Aspergillus* spp. and *Penicillium* spp. even 15 days after the inoculation.

In order to find out the effect of concentrations (ie CFU/ml) of *Gluconobacter* and *Hanseniaspora* with respect to the efficiency of biological product of the disclosure as antifungal, another challenge was made according to what was explained in Example 1, but this time testing different concentrations of *Gluconobacter* and *Hanseniaspora* (Table 1). According to what is observed in FIGS. 5 to 8, the biological product of the disclosure exerts an effective antifungal effect against *Rhizopus* spp., *Botrytis cinerea*, *Aspergillus* spp. and *Penicillium* spp., both at 4 and 20 days post-infection. More importantly, FIGS. 5 to 8 show that, regardless of bacteria and yeast concentrations, an effective and long-lasting bio-control of injuries produced by pathogen fungi is always observed.

With these results we conclude that biological product of the disclosure exerts an effective antifungal effect even 20 days after its application. In addition, antifungal effects are not greatly affected by bacteria or yeast concentration used.

Example 4: The Product of the Disclosure is as or More Effective than Synthetic Commercial Antifungals In order to compare the antifungal efficacy of biological product of the disclosure with synthetic commercial antifungals, a challenge was made using cv Red Globe grape berries which were inoculated with the causative agents of cluster rot (FIG. 9) or gray rot (FIG. 10). Berries with wounds (FIG. 9A, 9B, 10A, 10B) or without them (FIG. 9C, 9D, 10C, 10D) were analyzed and compared to evaluate whether this variable affected the antifungal effect of the present disclosure. A combination of *Gluconobacter* and *Hanseniaspora*, or a commercial synthetic antifungal comprising Cypronidil+Fludioxinil, was administered as indicated in Example 1 to the infected berries. After 5 days at 24° C., the antifungal effect on the incidence was estimated as the percentage of affected fruits in a given cluster (FIG. 9A, 9C, 10A, 10C) and in the severity as the injury diameter (FIG. 9B, 9D, 10B, 10D). In each experiment, 10 different clusters were analyzed, each with 10 berries. The results allowed the categorization of treatments according to statistical analysis (Tukey test $p \leq 0.05$).

According to our results, it is observed that the biological product of the present disclosure is as effective as the standard synthetic treatment in diminishing the signs of cluster rot (acid rot) or gray rot when the plant has not suffered injuries (FIG. 9C, 9D, 10C, 10D). More importantly, the biological product of the present disclosure is even more effective than the synthetic standard in decreasing the injuries diameters caused by pathogenic fungi when the plants have previously suffered injuries. (FIG. 9A, 9B, 10A, 10B) demonstrating a surprising effect of *Gluconobacter* and *Hanseniaspora* combination in reducing the severity of infections acquired through wounds.

From these data we conclude that the biological product of the present disclosure is as or more effective than commercial synthetic antifungal products. In addition, the biological product of this disclosure has a clear effect in reducing the severity of infections acquired through wounds, effect that is not observed as effectively with commercial synthetic antifungal. This aspect clearly represents an advantage of the present disclosure with respect to the state of the art.

Example 5: The Product of the Disclosure is as or More Effective than Commercial Antifungals in the Presence of Low Temperatures An important aspect to consider is, if the biological product of the disclosure tolerates exposure to low temperatures and if its effect persists when it is subjected to room temperature after a cooling period (normal conditions for commercialization process). In order to find out whether the present disclosure maintains its effectiveness over time after a cold shock, we performed the same challenge as that described in Example 4, with the exception that the infected berries were first incubated 5 days at 0° C. and then 6 days at room temperature before evaluating the incidence and severity of the disease in the same way as described in Example 4.

The results indicated that the biological product of the disclosure is as or more effective than the synthetic antifungal, even after having experimented the cold shock (FIGS. 11 and 12). The antifungal effect of the biological product of the disclosure is especially good against gray rot in the presence of wounds (FIG. 12) under tested conditions, reinforcing the protective effect of wounds that *Gluconobacter* and *Hanseniaspora* combination exert.

According to these results, we conclude that the biological product of the disclosure keeps its effectiveness even in the presence of cold shocks. Moreover, the effectiveness of the present disclosure with respect to the decrease in the incidence and severity of plant diseases caused by fungi is even higher than that obtained with synthetic antifungal compounds.

The invention claimed is:

1. A biological product for the control of fungal diseases in vegetables comprising a bacteria of *Gluconobacter* genus and a yeast of *Hanseniaspora* genus, wherein *Hanseniaspora* is *Hanseniaspora osmophila*.

2. A biological product, according to claim 1, wherein *Gluconobacter* is *Gluconobacter cerinus*.

3. A biological product, according to claim 2, wherein *Gluconobacter cerinus* corresponds to strain 515 access code RGM2215, deposited in the Chilean Collection of Microbial Genetic Resources.

4. A biological product, according to claim 1, wherein *Hanseniaspora osmophila* corresponds to strain 337 access code RGM2214, deposited in the Chilean Collection of Microbial Genetic Resources.

5. A biological product according to claim 1, further comprising at least $1 \times 10^6$ [CFU/ml] of *Gluconobacter* spp.

6. A biological product according to claim 5, further comprising $1 \times 10^6$ [CFU/ml] to $1 \times 10^8$ [CFU/ml] of *Gluconobacter* spp.

7. A biological product according to claim 1, further comprising at least $1 \times 10^4$ [CFU/ml] of *Hanseniaspora* spp.

8. A biological product according to claim 7, further comprising $1\times10^4$ [CFU/ml] to $1\times10^6$ [CFU/ml] of *Hanseniaspora* spp.

9. A method for preparing a biological product of claim 1, wherein at least $1\times10^6$ [CFU/ml] of *Gluconobacter* spp. and at least $1\times10^4$ [CFU/ml] of *Hanseniaspora* spp. are mixed.

10. A method for the control of vegetable fungal diseases comprising administering a biological product according to claim 1 to a plant.

11. A biological product according to claim 1, wherein the product is configured to treat, prevent, control or cure fungal diseases in plants.

12. The method according to claim 10, wherein the fungal diseases are produced by Deuteromycota.

13. The method according to claim 12, wherein the Deuteromycota is *Aspergillus* spp.

14. The method according to claim 12, wherein the Deuteromycota is *Penicillium* spp.

15. The method according to claim 12, wherein the Deuteromycota is *Botrytis* spp.

16. The method according to claim 10, wherein the fungal diseases are produced by Zygomycota.

17. The method according to claim 16, wherein the Zygomycota is *Rhizopus* spp.

18. The method according to claim 10, wherein the plant is a fruit plant.

19. The method according to claim 18, wherein the fruit plant is a vine, pome, prunus, citrus or a berry.

20. The method according to claim 10, wherein the plant is a fruit vegetable.

21. The method according to claim 20, wherein the fruit vegetable is tomato, paprika, eggplant or zucchini.

22. The method according to claim 10, wherein the plant is a leafy vegetable.

23. The method according to claim 22, wherein the leafy vegetable is lettuce, chard, or spinach.

24. The method according to claim 10, wherein the fungal disease that can be treated, prevented, controlled or cured is acid rot or cluster rot.

25. The method according to claim 10, wherein the fungal disease that can be treated, prevented, controlled or cured is gray rot.

\* \* \* \* \*